United States Patent Office 3,455,971
Patented July 15, 1969

3,455,971
METAL SALTS OF QUINOID NITROXIMES
Nicodemus E. Boyer, Parkersburg, W. Va., assignor, by mesne assignments, to Lord Corporation, Erie, Pa., a corporation of Pennsylvania
No Drawing. Filed Mar. 23, 1966, Ser. No. 536,669
Int. Cl. C07c *131/00*
U.S. Cl. 260—396      7 Claims

ABSTRACT OF THE DISCLOSURE

Metal salts of quinoid nitroximes having the formula:

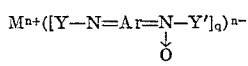

wherein Ar is selected from the group consisting of

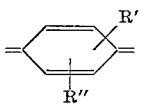

and

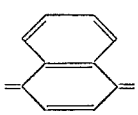

where R' and R" are each selected from the group consisting of hydrogen and lower alkyl groups; wherein Y and Y' are each selected from the group consisting of O— and OH, at least one of Y and Y' being O—; wherein M is a metal cation having a valence $n$ of from 1 to 4; and wherein $q$ equals $n$ when only one of Y and Y' is O— and $q$ is $n/2$ when both Y and Y' are O—.

---

The use of these salts as curing agents for rubber-metal adhesives containing a halogenated rubber is disclosed and claimed in my copending application Ser. No. 536,616, filed even date herewith.

This invention relates to aromatic quinoid nitroximes and more particularly to cationic salts of aromatic quinoid aci-nitrooximes.

Compounds containing aci-nitro groups having quinoid-type aromatic rings were prepared prior to this invention and were known to form salts with alkali metal cations under certain reaction conditions. Also, metal salts containing oximino groups were prepared prior to this invention. These types of compounds were considered research novelties and were not known to demonstrate any specific utility. Aromatic quinoid compounds containing both aci-nitro and oximino groups and their salts were neither prepared nor reported in the literature prior to the invention.

Generally stated, this invention is directed to salts of aromatic quinoid nitroximes which contain both oximino and aci-nitro groups on an aromatic quinoid ring. The aromatic quinoid nitroxime salts of this invention have been found to be useful in the preparation of adhesives and specifically have been found to be useful in the vulcanization of rubber and rubber products.

The aromatic quinoid nitroxime monomers utilized in preparing the salts of this invention are of the general formula:

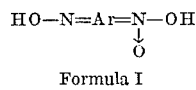

Formula I wherein Ar is an aromatic hydrocarbon para quinoid group or substituted aromatic hydrocarbon para quinoid group. Examples of some of the aromatic quinoid nitroximes that fall under generic Formula I above are such compounds as p-phenylene nitroxime; p-tolylene nitroxime; o-naphthylene nitroxime and the like. It will be obvious to those skilled in the art that isomeric structures may occur, depending upon the location of the aci-nitro and the oxime groups on the aromatic quinoid ring or rings.

The aromatic quinoid nitroxime salts of this invention may be illustrated by the formula:

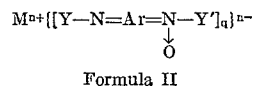

Formula II wherein Ar is selected from the group consisting of aromatic quinoid and substituted aromatic quinoid groups, Y and Y' are selected from the group consisting of oxygen carrying a negative charge and hydroxyl, M is a metal cation, and $n$ and $q$ are positive integers.

The aromatic quinoid nitroxime salts of this invention are ordinarily of the structure shown in Formulae III, IV and V.

Formula III    Formula IV

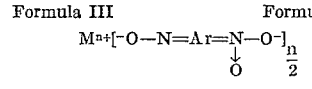

Formula V wherein Ar, M, $n$ and $q$ are as defined in Formula II.

The aromatic quinoid nitroxime salts of this invention are normally prepared by first oxidizing a basic solution of aromatic dioxime to prepare an aromatic dinitroso compound. The basic solution may be prepared from an aqueous solution of an alkali metal hydroxide and the oxidizing agent is preferably an alkali metal hypochlorite. Other oxidizing agents such as potassium ferricyanide, oxygen, a peroxy acid, an organic peroxide, or hydrogen peroxide may also be used. The aromatic dinitroso compound formed is treated with an alkali metal hydroxide to place it in solution and form an organic sodium salt. The alkali hydroxide may be replaced by aqueous pyridine, aqueous ammonia or another base. The organic sodium salt is treated with an inorganic metal salt, such as, for example, iron sulfate to prepare a metal salt of an aromatic nitroxime. The reaction may be illustrated as shown in the equation below.

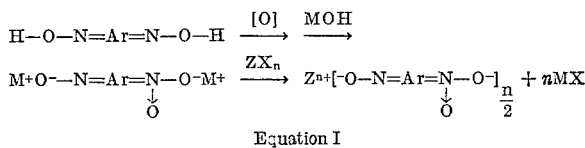

Equation I wherein Ar is an aromatic group, M is an alkali metal such as sodium, potassium, lithium, etc., X is an anion such as a halide or sulfate ion, and Z is a mono- or polyvalent metal cation, such as ferrous, ferric or silver (I) ion. The salts of this invention may be mono-, di-, tri- or tetravalent depending on the specific valency of the cation of the inorganic salt $ZX_n$ used in the reaction.

Should it be desired to start with an aromatic dinitroso compound in the preparation of the metal salts of the aromatic nitroximes, it is not necessary that the oxidation step be included inasmuch as aromatic dinitroso compounds are oxidation products of aromatic dioximes.

In the preparation of the metal salt from a dinitroso compound, the reaction will proceed as follows:

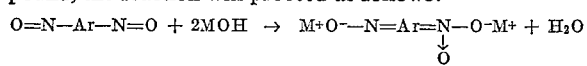

Equation II

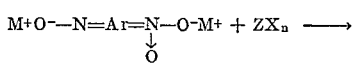

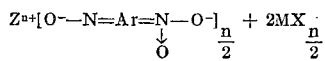

Equation III wherein Ar, M, X and Z are defined as in Equation I.

The mechanism of Equations II and III may involve as intermediates the monoalkali salts, for example, formed by the addition of one mole of sodium hydroxide to one mole of green, monomeric p-dinitrosobenzene (Equation IV) or to poly-(diazodioxy-p-phenylene), the yellow polymeric product from p-dinitrosobenzene (Equation V).

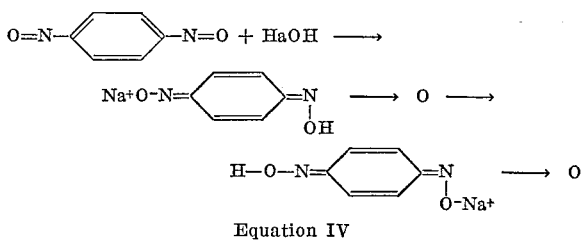

Equation IV

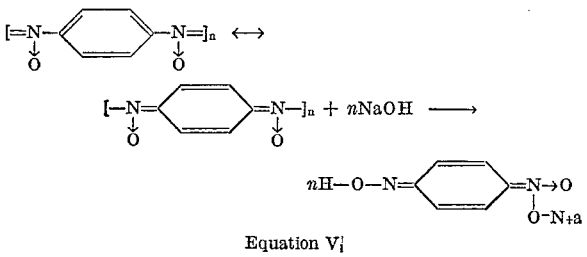

Equation V

Because of their poor solubility in water and in many polar and nonpolar organic solvents, such products of this invention as iron (II) p-phenylene nitroxime and silver (I) p-phenylene nitroxime are considered to be complexes resembling polymers rather than simple salts. This is illustrated by the Formula VI of the moss green silver (I) complex of Example IV, where $x$ is an integer, and : is an electron pair which is donated by a nitrogen atom to the silver ion.

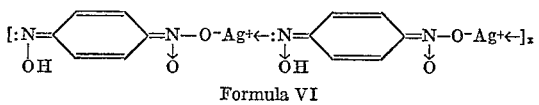

Formula VI

The following examples are set forth to illustrate a preferred procedure for producing specific compounds in accordance with this invention. The parts are by weight unless otherwise indicated.

EXAMPLE 1

Preparation of iron (II) p-phenylene nitroxime from p-benzoquinone dioxime 2.17 moles (300 g.) of p-benzoquinone dioxime was dissolved in 3 liters of 1 N aqueous sodium hydroxide. 3080 g. of commercial (5.25 percent) sodium hypochlorite solution containing about 2.17 moles (162 g.) of pure sodium hypochlorite was added dropwise to this solution. The solution was stirred and cooled to about 7–10° C. during the addition of the sodium hypochlorite. A yellow precipitate formed which was filtered and washed. The precipitate was dried for thirty-six hours at 25° C./1 mm. in the presence of a drying agent. A yield of the yellow precipitate, poly(diazodioxy-p-phenylene) which is the associated product from p-dinitrosobenzene, was 256.3 g. or 86.8 percent of theoretical yield (theoretical yield=295.6 g.). The product, 27.2 g. or 0.2 mole, was suspended in 900 ml. of water and only a small fraction of it dissolved. The light yellow solution had a pH of 4. A solution of 8 g. or 0.2 mole of sodium hydroxide in 100 ml. of water was added and the solubility improved to form a brown solution. A solution of 0.1 mole (27.8 g.) iron (II) sulfate heptahydrate in 1 liter of water was added to this mixture. A dark green-brown precipitate formed through the addition of the ferrous sulfate solution. The mixture was warmed to 55° C. and filtered. The brown precipitate was air-dried for 24 hours and then dried in a vacuum oven for six hours at 40° C./1 mm.; the yield was 18.8 g. or 91 percent. Analytical calculation for iron (II) p-phenylene nitroxime or $C_6H_4N_2O_3Fe$, was: nitrogen 23.5%; found, nitrogen, 13.7%. Iron content of samples from various runs was from 25 to 27% (Calcd., Fe, 26.8%).

The reaction was repeated with essentially similar results in aqueous ethanol as well as in aqueous pyridine. In aqueous pyridine, which is basic, the use of sodium hydroxide was not required. The organic iron salt made by any of these procedures was an excellent curing agent for adhesives used between metals and various stocks of rubber.

EXAMPLE 2

Preparation of the ferrous salt of p-phenylene nitroxime from p-dinitrosobenzene 0.057 mole or 7.8 g. of freshly sublimed, monomeric, green p-dinitrosobenzene was dissolved in 2 liters of ethanol at —20° C. and a solution of 0.114 mole or 2.28 g. of aqueous sodium hydroxide in 50 ml. of water was added thereto. A brown solution was formed, to which was added a solution of 0.057 mole or 7.4 g. of ferrous chloride in 200 ml. of ethanol. A brown organic ferrous salt formed in the solution. The solution was allowed to warm to room temperature and the brown ferrous salt of p-phenylene nitroxime was isolated by filtration at 0° C. and dried at 25° C./1 mm. for twelve hours. The yield of the first crop was 5.5 g. or 46%. An additional amount of the organic iron salt was obtained by concentrating the filtrate at a reduced pressure and by refiltering the residual liquid. *Analysis.*—Calcd.: Fe, 26.83%. Found: 27.04%.

EXAMPLE 3

Preparation of the lead salt of p-phenylene nitroxime 0.01 mole or 3.79 g. of lead (II) acetate trihydrate, $Pb(O_2C-CH_3)_2 \cdot 3H_2O$, was dissolved in a mixture of 100 ml. of water, 50 ml. of methanol and 20 ml. of ethanol. The colorless solution was cooled to about —15° C. and 0.01 mole or 1.36 g. of freshly sublimed, green, monomeric p-dinitrosobenzene, $ON-C_6H_4-NO$, was added directly from the sublimation head which was kept cold by a mixture of acetone and Dry Ice (solid carbon dioxide). The temperature of the p-dinitrosobenzene was kept below —15° C. to avoid polymerization to poly-(diazodioxy-p-phenylene).

The sample of p-dinitrosobenzene dissolved with a green color. A solution of 0.026 mole or 1.04 g. of sodium hydroxide in 20 ml. of water was added to the reaction mixture, which acquired carmine red color. The mixture was stirred, allowed to warm to room temperature, and filtered. The filtrate had a pH of about 6. The yellow solid on the filter was washed with water and alcohol, dried in the air, pulverized, and redried for 24 hours at 25° C./0.4 mm. in the presence of a drying agent. The product was analyzed as follows. Calculated for lead (II) p-phenylene nitroxime or $C_6H_4N_2O_3Pb$: N, 7.80%. Found, N, 7.82%. The product showed excellent curing activity in rubber to metal adhesives.

A similar reaction was carried out with poly(diazodioxy-p-phenylene), i.e., a yellow powder formed by spontaneous polymerization of green p-dinitrosobenzene, when the latter warmed to room temperature. The amount of yellow product used was 21.8 g. corresponding to 0.16 mole of monomeric p-dinitrosobenzene.

The yellow product was mixed with 400 ml. of 95% ethanol and 50 ml. of water and reacted with 8 g. or 0.2 mole of sodium hydroxide in 39 g. of water, whereupon a dark red brown solution of an organic sodium salt was formed. A solution of 0.1 mole or 38.0 g. of lead (II) acetate trihydrate in 150 ml. of water was added to this solution in small portions under constant stirring. After the addition was complete, the pH of the solution was about 7. The mixture was filtered and the precipitate was washed with water and ethanol, and dried at 25° C./1 mm. overnight. The yield of organic lead (II) salt was 92% based on the amount of lead acetate used in the reaction.

EXAMPLE 4

Preparation of silver (I) p-phenylene nitroxime

Utilizing a procedure similar to that described in Example 3, a moss green, organic silver (I) salt was synthesized from a solution of 0.057 mole or 9.7 g. of silver nitrate in 1500 ml. of 95% ethanol and 50 ml. of water; 0.057 mole or 7.8 g. of green, monomeric p-dinitrosobenzene at about −20° C., and a solution of 0.057 mole or 2.28 g. of sodium hydroxide in 30 ml. of water.

Alternatively, the same moss green organic silver (I) complex was prepared from poly(diazodioxy-p-phenylene), i.e., the yellow polymerization product from p-dinitrosobenzene, 0.16 mole or 21.8 g. in 400 ml. of ethanol and 50 ml. of water; 0.2 mole or 8 g. of sodium hydroxide in 39 ml. of water; and 0.1 mole or 7.0 g. of silver nitrate in 100 ml. of water.

EXAMPLE 5

Preparation of cobalt (II) p-phenylene nitroxime

The procedures outlined in Example 3 were utilized in the preparation of dark brown cobalt (II) p-phenylene nitroxime from 0.01 mole or 2.91 g. of cobalt (II) nitrate hexahydrate, $Co(NO_3)_2 \cdot 6H_2O$, in 1000 ml. of ethanol; 0.01 mole or 1.36 g. of p-dinitrosobenzene; and 0.02 mole or 0.8 g. of sodium hydroxide in 20 ml. of water. The brown organic cobalt complex was found to be an excellent curing agent for polymeric adhesives and various stocks of rubber.

EXAMPLE 6

Preparation of nickel (II) p-phenylene nitroxime

The procedure of Example 3 was used to prepare a brown, organic nickel complex from equimolar amounts of nickel (II) chloride hexahydrate and p-dinitrosobenzene and from twice the molar amount of sodium hydroxide in aqueous ethanol. The product showed the composition of elements corresponding to the formula of nickel (II) p-phenylene nitroxime, and was found to be an excellent curing agent for rubber stock.

EXAMPLE 7

Preparation of p-phenylene nitroxime salts of metals other than iron (II)

Similar organic salts or complexes as in Examples 3–6 were prepared from metallic cations, p-dinitrosobenzene, and sodium hydroxide, using as starting materials the following inorganic salts; a green organic salt from iron (III) chloride; a dark green organic salt from basic copper (II) acetate or blue verdigris; a light brown organic salt from cadmium (II) chloride; a greenish tan salt from sodium cobaltinitrite, $Na_3Co(NO_2)_6$; a brown salt from manganous chloride, $MnCl_2$, a brown-black salt from copper (I) chloride; a green salt from mercury (I) chloride; a light brown salt from mercury (II) chloride; a red-brown salt from tin (II) chloride; a chocolate-brown salt from zinc (II) chloride; a brown salt from aluminum (III) chloride; and a light brown salt from thorium (IV) nitrate.

EXAMPLE 8

Preparation of iron (II) 2-methyl-5-isopropyl-1,4-phenylene nitroxime 100 g. or 0.515 mole of thymoquinone dioxime, pale tan-white crystals, M.P. 235° C., was dissolved in 550 ml. of 2 N solution of sodium hydroxide, containing 44 g. or 1.1 moles of NaOH. The solution was filtered and cooled to 0° C. A cold solution (0° C.) of potassium cyanoferrate (III), $K_3[Fe(CN)_6]$, 346 g. or 1.1 moles, in one liter of water was added dropwise to this solution. The pale, greenish yellow precipitate was collected on a filter, suspended in 2 liters of water, mixed well to dissolve traces of inorganic impurities (oxidizing agent and base), and refiltered. The product yield after drying to constant weight at a reduced pressure and at room temperature, was 75 g. or 0.39 mole (75.6%) of 2-methyl-5-isopropyl-1,4-dinitrosobenzene. When purified by sublimation, the greenish yellow crystals melted at 122°–123° C. The nitrogen analysis was as follows. Calculated for $C_{10}H_{12}O_2N_2$: N, 14.60%. Found, N, 14.67%.

0.1 mole or 19.2 g. of 2-methyl-5-isopropyl-1,4-dinitrosobenzene was dissolved in one liter of ethanol and reacted with 0.1 mole or 4 g. of sodium hydroxide in 30 ml. of water and thereafter reacted with a solution of 0.05 mole or 6.4 g. of iron (II) chloride in 100 ml. of water. A brown precipitate of iron (II) 2-methyl-5-isopropyl-1,4-phenylene nitroxime was formed, collected by filtration, washed with water and ethanol, and dried at 25° C./1 mm. overnight. A second crop of dark brown crystals was obtained by distillation of the filtrate at a reduced pressure and by another filtration. The yield of the brown organic iron (II) complex was 13 g. (0.049 mole or 98%).

EXAMPLE 9

Preparation of iron salt of 2-methyl-1,4-phenylene nitroxime 0.2 mole of 2-methyl-1,4-quinone dioxime was dissolved in 200 ml. of 2 N aqueous hydroxide at room temperature. A solution of 0.22 mole of sodium hypobromide and 0.22 mole of sodium bromide in 400 ml. of water was added to the sodium hydroxide solution with external cooling of the mixture to 0° C. The mixture was stirred vigorously throughout the addition. A light yellow precipitate formed which was dried at 25° C. in a vacuum oven. The yield was 27.7 g. of material with a melting point of 131° C. The product was dissolved in a mixture of 550 ml. of pyridine and 18 ml. of water at 100° C. A solution of 0.2 mole of anhydrous ferrous chloride in 480 ml. of pyridine and 16 ml. of water was added to the solution of 2-methyl-1,4-dinitrosobenzene in pyridine. The iron salt of 2-methyl-1,4-phenylene nitroxime was formed with a yield of 65 percent.

EXAMPLE 10

Preparation of iron salt of 1,4-naphthylene nitroxime 0.1 mole of 1,4-naphthoquinone dioxime and 0.2 mole of anhydrous sodium carbonate were dissolved in 200 ml. of water. A solution of 0.22 mole of potassium ferricyanide in 150 ml. of water was added to this solution. A light yellow precipitate formed and was suspended in 1½ liters of methanol. A solution of 0.15 mole of sodium hydroxide in 50 ml. of demineralized water as well as 0.1 mole of ferrous bromide and 45 ml. of water were simultaneously added to the methanol solution. A brown salt identified as the iron salt of 1,4-naphthylene nitroxime was formed, dried and isolated as in the other examples. There was a yield of 76 percent.

EXAMPLE 11

Preparation of ferrous bis(p-phenylene nitroxime)

In this experiment, ferrous bis(p-phenylene nitroxime) was isolated, which corresponds to the general Formula III or IV, where M=Fe, and n=2.

13.6 g. or 0.1 mole of monomeric p-dinitrosobenzene was dissolved in 3 liters of ethanol at −20° C. and reacted with 0.05 mole or 6.4 g. of iron (II) chloride in 300 ml. of ethanol along with 0.1 mole or 4 g. of sodium hydroxide in 20 g. of water. The initial dark brown precipitate (predominantly ferrous p-phenylene nitroxime as in Example 2) was removed by filtration. The filtrate was concentrated by distillation of the ethanol, at reduced pressure, to a smaller volume. The residual liquid was refiltered, and the product, a light brown, organic iron salt, was collected by a second filtration. The product was dried in the usual manner and identified by analyses as ferrous bis(p-phenylene nitroxime). The calculated nitrogen content for this complex, $C_{12}H_{10}O_6N_4Fe$, was 15.47%; found, 15.47%. This salt (i.e., "1:2 salt," one iron (II) cation to two p-phenylene nitroxime residues), was found to be an effective curing agent of adhesives and various stocks of rubber.

It should be noted that in the examples, a variety of inorganic metal salts of aromatic quinoid nitroximes were formed. It is to be understood that the examples are meant to illustrate compounds of this invention as well as their method of preparation, and are not meant to restrict the invention in any way. For example, mono-, di-, tri-, or tetravalent metal salts are equally operable in the preperation of the inorganic metal salts of the aromatic quinoid nitroximes, though, for the most part, the iron (II) salts of the aromatic quinoid nitroximes have been shown in the above examples.

What is claimed is:

1. Metal salts of quinoid nitroximes of the formula:

$$M^{n+}([Y-N=Ar=N-Y']_q)^{n-}$$
$$\downarrow$$
$$O$$

wherein Ar is selected from the group consisting of

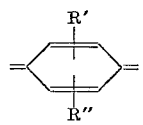

and

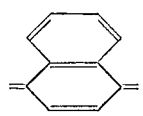

where R' and R'' are each selected from the group consisting of hydrogen and lower alkyl groups; wherein Y and Y' are each selected from the group consisting of O⁻ and OH, at least one of Y and Y' being O⁻; wherein M is a metal cation having a valence $n$ of from 1 to 4, and wherein $q$ equals $n$ when only one of Y and Y' is O⁻ and $q$ is $n/2$ when both Y and Y' are O⁻.

2. Metal salts of claim 1 wherein Ar is

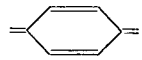

and M is iron (II).

3. Metal salts of claim 1 wherein Ar is

and M is iron (II).

4. Metal salts of claim 1 wherein Ar is

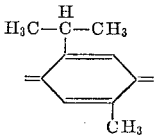

and M is iron (II).

5. Metal salts of claim 1 wherein Ar is

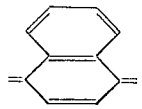

and M is iron (II).

6. Metal salts of claim 1 wherein M is selected from the group consisting of cobalt (II), cobalt (III), nickel (II), lead (II), copper (I), copper (II), iron (II), iron (III), cadmium (II), silver (I), manganese (II), mercury (I), mercury (II), tin (II), zinc (II), aluminum (III) and thorium (IV).

7. A method of preparing an aromatic hydrocarbon para quinoid nitroxime salt comprising the steps of:
 oxidizing a basic solution of an aromatic hydrocarbon para dioxime to provide an aromatic dinitroso compound;
 treating the dinitroso compound with an alkali metal base; and
 precipitating the aromatic hydrocarbon para quinoid nitroxime salt product by addition of an inorganic metal salt.

References Cited

661,439  4/1963  Canada.

DANIEL D. HORWITZ, Primary Examiner

U.S. Cl. X.R.

260—2, 47; 161—213

PO-1050
(5/69)

UNITED STATES PATENT OFFICE
CERTIFICATE OF CORRECTION

Patent No. 3,455,971      Dated July 15, 1969

Inventor(s) Nicodemus E. Boyer

It is certified that error appears in the above-identified patent and that said Letters Patent are hereby corrected as shown below:

Column 3, line 21; "HaOH" should be -- NaOH --

Column 3, line 39; "O⁻N⁺a" should be -- O⁻Na⁺ --

Column 3, line 50; "N=     should be -- N=   --
                       |
                       OH"                OH Column 4, line 15; "23.5%" should be -- 13.5% --.

SIGNED AND
SEALED
MAY 5 1970

(SEAL)
Attest:

Edward M. Fletcher, Jr.
Attesting Officer

WILLIAM E. SCHUYLER, JR.
Commissioner of Patents